Aug. 6, 1946.    T. C. VAN DEGRIFT    2,405,474
BALANCING MACHINE
Filed Nov. 27, 1942    2 Sheets-Sheet 1
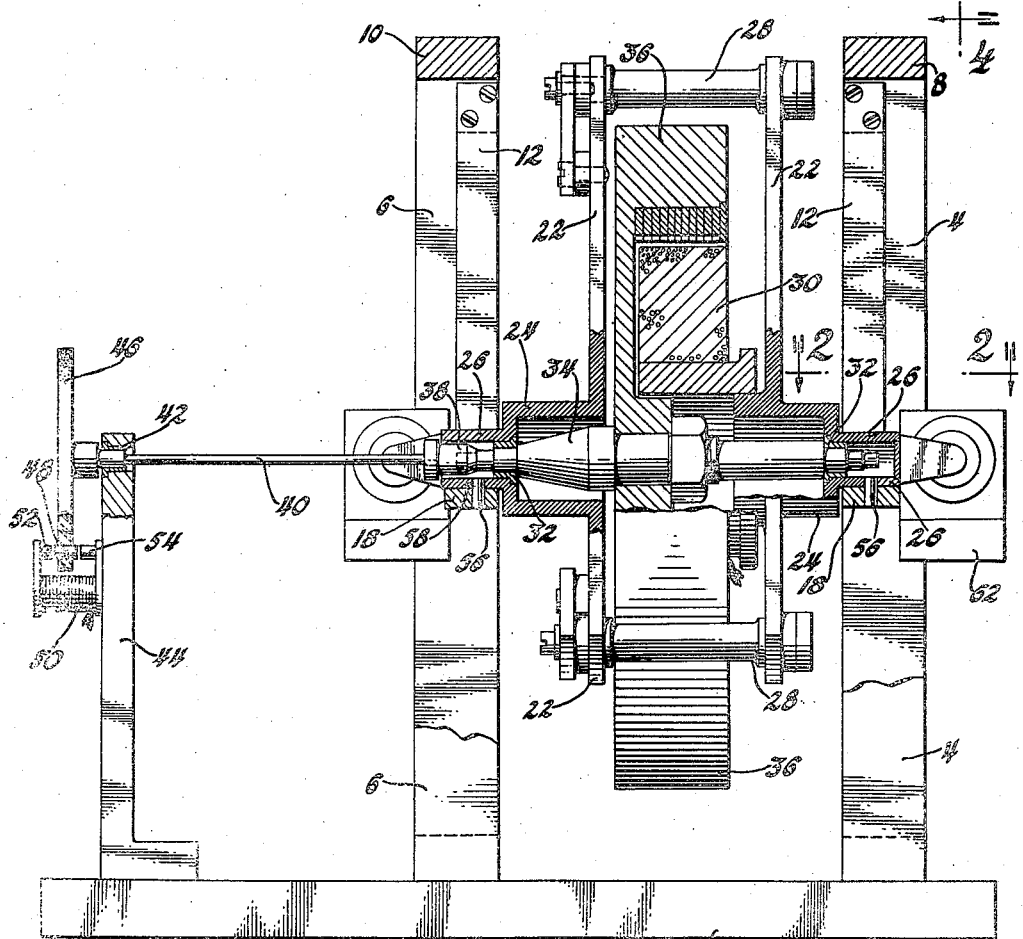
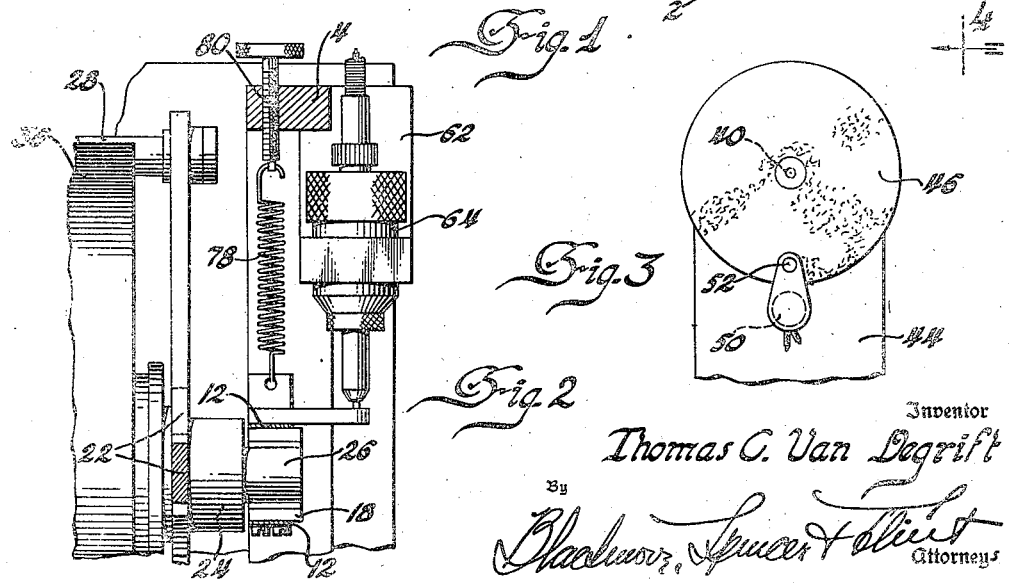
Inventor
Thomas C. Van Degrift
By
Blackmore, Spencer & Oliver
Attorneys Aug. 6, 1946. T. C. VAN DEGRIFT 2,405,474
BALANCING MACHINE
Filed Nov. 27, 1942 2 Sheets-Sheet 2
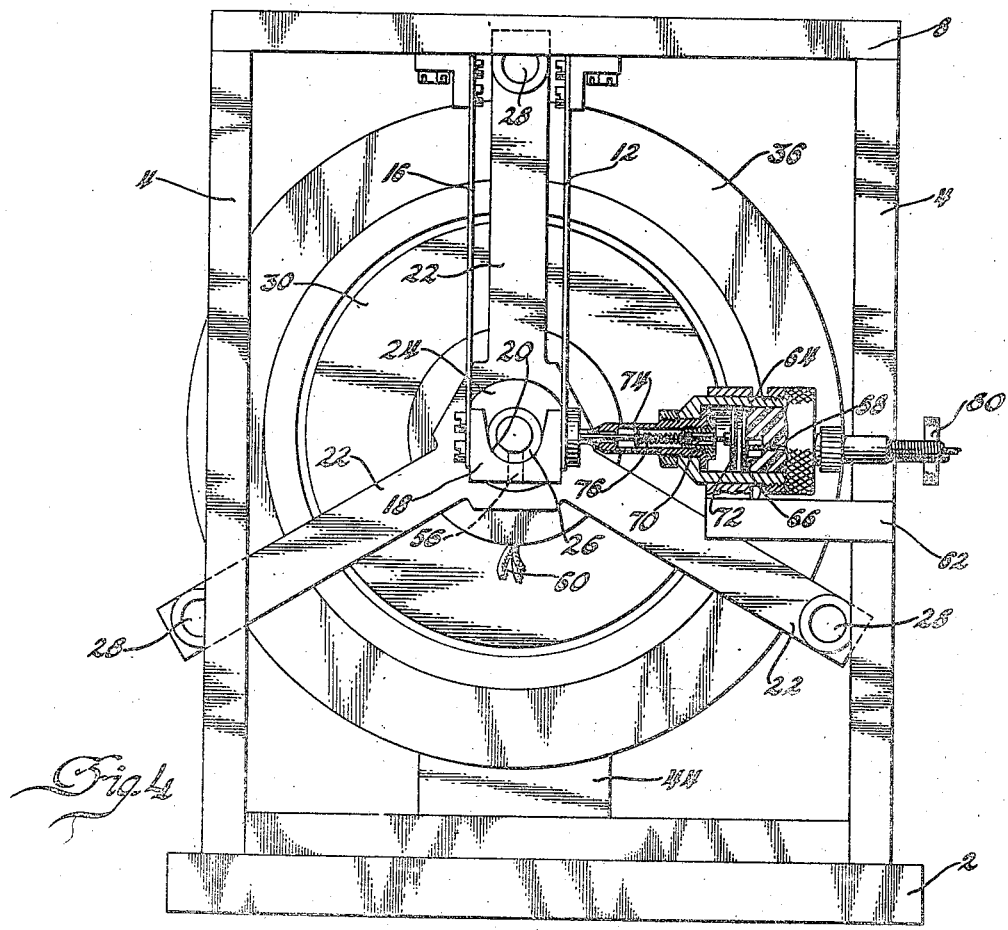
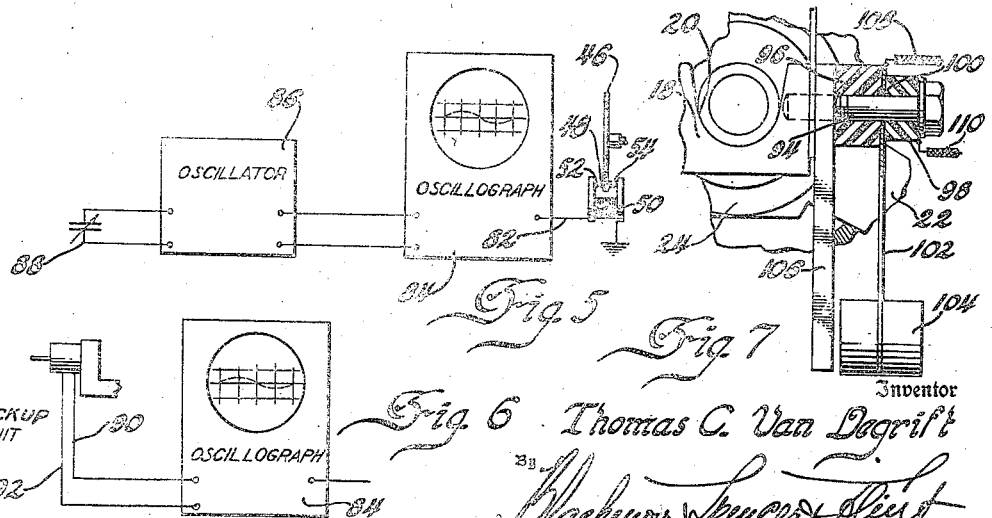

Patented Aug. 6, 1946

2,405,474

UNITED STATES PATENT OFFICE 2,405,474

BALANCING MACHINE

Thomas C. Van Degrift, Detroit, Mich., assignor to General Motors Corporation, Detroit, Mich., a corporation of Delaware Application November 27, 1942, Serial No. 467,113

11 Claims. (Cl. 73—66)

This invention relates to balancing means and more specifically to means for dynamically balancing a rotating part at substantially the speed at which it will normally operate in service. Dynamic forces applied to a rotating body occasion various vibrations which cannot be anticipated by statically balancing the device and it is therefore necessary in many instances and especially where the rotative speed is high to carefully balance bodies dynamically so that they may operate satisfactorily and not be subject to vibrations set up by dynamic forces therein.

It is therefore an object of my invention to provide a means for dynamically balancing a rotating part.

It is a further object of my invention to provide an assembly of driving means and a part to be dynamically balanced which may be easily inserted into supporting means.

It is a still further object of my invention to provide a resiliently mounted supporting assembly into which a previously assembled driving and driven means may be easily inserted.

It is a still further object of my invention to provide a balancing machine for rotative parts which is simple and rugged in construction.

With these and other objects in view which will become apparent as the specification proceeds, the embodiments of my invention will be best understood by reference to the following specification and claims and the illustrations in the accompanying drawings, in which:

Figure 1 is a vertical section taken through a machine embodying my invention;

Figure 2 is an enlarged detail sectional view taken on line 2—2 of Figure 1;

Figure 3 is an end view of the angular indexing device;

Figure 4 is an end view of the mechanism taken on line 4—4 of Figure 1, parts being broken away and shown in section;

Figure 5 is a schematic wiring diagram of the indicating means associated with the balancing machine;

Figure 6 is a schematic circuit diagram showing the pick-up unit connected to the indicating means; and Figure 7 is a detailed sectional view showing a different type of vibration condenser pick-up means.

Referring now more specifically to Figure 1, there is shown therein a base 2 upon which is mounted a pair of vertical frame members 4 and 6 which are connected together by horizontal top cross members 8 and 10. Adjacent the center of the top cross members 8 and 10 are supported a pair of spaced flexible leaf spring members 12 and 16 on each side. These resilient leaf spring members extend down to approximately the center of the frame formed by the side members and support upon their lower ends an open bearing member 18, the upper surface of which is grooved to form a substantially semi-circular portion 20, into which may be inserted the ends of a cradle assembly including the port to be tested. This assembly comprises a pair of side plates formed of a series of radiating arms 22 which extend outwardly from a center hollow hub 24 which is cylindrical and has upon its outer end a smaller cylindrical member 26. The ends of the radiating arms 22 are connected to the opposite frame arms on the other side member by spacing connecting means 28. This assembly therefore forms a hollow drum-like frame into which may be inserted the device to be tested simply by removing the securing means in the transverse members 28 to lift one frame member from the other.

Fixedly secured to one of the central cylindrical members 24 is a motor field stator winding 30 capable of creating a rotating field when energized. The cylindrical members 26 each carry adjacent their ends where they enlarge into the portions 24 a bearing member 32 which is adapted to support the shaft 34 of a rotor 36 to be tested which has laminations in the manner of conventional squirrel cage induction rotors. The end of the rotor shaft projects into the hollow space left in the cylindrical portion 26 in each instance and on one end has forced thereover a press-fitted coupling 38 which is supported upon a transverse shaft 40, the latter being trunnioned in bearing 42 carried by upright 44 on the base 2. On the opposite side of the bearing 42 a disc 46 is applied to the shaft and is adapted to rotate therewith. This disc is formed of insulating material and at one portion adjacent its periphery carries an axial pin 48 of conductive material. Also mounted on the upright 44 is an electromagnetic coil 50 having a U-shaped core terminating in two projecting pins 52 and 54 which extend toward each other leaving an air gap therebetween in which the disc 46 and axial pin 48 rotate. Thus once each revolution of the shaft the pin 48 will lie normally between the members 52 and 54 and decrease the reluctance of the magnetic circuit to cause the coil 50 to provide an impulse and in this manner give an angular impulse or index for the rotating member.

There is provided a small pin 56 which is anchored in the lower portion of the cradle member 18 and which projects through an opening 58 in the cylindrical portion 26 of the frame to prevent the frame per se from turning. Thus on an application of power to the stator winding 30 through the terminals 60 the rotor 36 may be caused to rotate about its axis on its shaft 34 in bearings 32 which rotation will also cause the shaft 40 and index disc 46 to rotate, the remaining portion of the frame being held stationary by pins 56. As the rotor rotates at its given speed, if there are forces of unbalance which are brought into play by such rotation, the members 18 supported on the resilient strips 12 and 16 will be caused to move in a horizontal plane by such force.

In order to pick up this vibration, I have provided a bracket 62 which extends from the side frame members 4 or 6 and which supports upon its outer end a hollow cylindrical casing 64 within one end of which is insulatedly mounted a disc 66 connected by a suitable line 68 with indicating apparatus to be described. The opposite end of the cylindrical casing 64 movably supports a rod 70 upon one end of which is secured a second spaced disc 72 which is brought into juxtaposition with the first disc 66. This rod also carries a small disc 74 between which and a portion of the casing there is mounted a concentric spring 76 to spring bias the rod outwardly. The end of this rod is brought into juxtaposition and bears against a face of the cradle member 18 and is therefore moved back and forth by any horizontal vibration thereof. This movement thus alters the distance between the two discs 72 and 66 which form a condenser and therefore varies the capacity of the same to give indications. One of these units is provided adjacent each bearing member. In order to maintain the bearing or cradle member against the end of the rod 70 a spring 78 is provided which has one end secured to the cradle member and the opposite end adjustably secured to the frame through thumb screw 80.

In operating the balancing machine therefore the two frame members are taken apart, the stator winding 30 remaining secured to one and the rotor to be tested is inserted with one end of its shaft in bearing 32 on the frame member carrying the stator. The other frame member is then applied, the other end of the rotor shaft extending through the second bearing 32 and the spacing means 28 is secured at the ends of arms 22. This assembly is then laid in the open bearings 18, the pins 56 preventing the assembly from turning. The coupling 38 is pressed onto the end of the rotor shaft to drive the angular indexing means and the condenser pick-up means are then adjusted so that the spring-biased rods 70 contact the cradle members 18. The machine is then in readiness for testing the rotor.

The disc 46 and its associated electromagnet 50 provides the angular index, the latter being connected through line 82 with an oscillograph 84 and is so connected as to trigger the horizontal sweep circuit of the same so that at the instant the pins 48 passes between the pins 52 and 54 the sweep circuit is caused to start, thus giving this point as the beginning of the wave on the oscillograph. In order to ascertain the speed, an oscillator of known frequency 86 may be connected to the oscillograph and when the two frequencies coincide the wave appearing thereon will of course remain stationary indicating that the two frequencies are the same and by knowing the frequency of the oscillator the rotative speed of the test part will be known. An adjustable capacitor 88 is provided to vary the frequency of the known oscillator.

In order to ascertain the amplitude of the vibrations which are picked up by the condenser pick-up means formed of the two plates 72—66, the latter are connected by lines 90 and 92 with the vertical displacement circuit of the oscillograph and therefore as the capacity varies between these plates the potential across the vertical oscillograph plates will vary and cause vertical displacement of the cathode beam to give a direct reading of the amplitude of these horizontal vibrations. I have thus provided a means for impressing a potential indication of the amplitude of said vibrations and also an angular indexing means to determine the angular position of the maximum vibration forces since the number of angular degrees from the starting point can be figured from the oscillograph.

Referring to Figure 7, there is therein shown a modified pick-up form in which a stud 94 is threaded into one side of the cradle member 18 and carries an insulating washer 96 and a smaller insulating washer 98. Mounted between these two insulating parts and having an opening 100 therethrough of larger diameter than the stud is a resilient lever or bar 102 which is firmly clamped to the stud but insulated therefrom. The projecting end of the bar carries a weight 104 which projects to within a short distance of a member 106 connected to the cradle 18. A conductor 108 is connected to one end of the member 102 and a second conductor 110 is connected directly to the stud and therefore to the remainder of the apparatus. Upon vibration the weight 104 will therefore move back and forth relative to the member 106 and the capacity thereby formed will be varied in much the same manner as the capacity pick-up formerly described. However, this construction is considerably simpler and in some instances it may be desirable to use this instead of the former device. Its function in the system would however be the same.

I claim:

1. In a machine for balancing rotating parts, a base, a pair of spaced open bearing members resiliently mounted on the base, a driving stator field assembly for supporting a driven rotor to be tested adapted to be slung in the bearing members, and pickup means mounted on the base adjacent each bearing member having a portion extending into contact therewith to pick up the vibration of the bearing member due to the rotation of the rotor.

2. In a machine for balancing a rotating part, a base, a plurality of spaced uprights mounted on the base, a pair of resilient strips supported from the uprights on each side, an open bearing member secured to the lower end of each pair of strips, a cradle mounted in the open bearing members, a stator driving field supported by the cradle, said rotating part being rotatably supported in juxtaposition to and driven by the stator on the cradle and vibration pick-up means mounted on the base and contacting the bearing members.

3. In a machine for balancing rotating parts, a base, a plurality of spaced upright supports, a pair of spaced bearing members resiliently supported from said upright supports, a substantially semi-cylindrical groove in the bearing members, cradle means to enclose and rotatably support a part to be balanced comprising a pair of side members having radial arms detachably connected together at their outer ends and central hollow shafts, which latter shafts are trunnioned in the spaced bearing members, and means for locking the shafts against rotation in the bearing members.

4. In a machine for balancing rotating parts, a base, a plurality of spaced upright supports, a pair of spaced bearing members resiliently supported from said upright supports, a substantially semi-cylindrical groove in the bearing members, cradle means comprising a pair of spaced separable side members having radial arms connected together at their outer ends and central hollow shafts for rotatably supporting a rotatable part to be balanced having shafts, said cradle shafts being trunnioned in the spaced bearing members, means for locking the cradle shafts against rotation in the bearing members, a driving stator coil fixedly mounted within the cradle in juxtaposition to the rotatable part, a transfer shaft coupled to the rotor shaft, and angular indexing means driven by the transfer shaft.

5. In a machine for balancing rotating parts, a base, a plurality of spaced upright supports, a pair of spaced bearing members resiliently supported from said upright supports, a substantially semi-cylindrical groove in the bearing members, cradle means comprising a pair of spaced separable side members having radial arms connected together at their outer ends and central hollow shafts for rotatably supporting a rotatable part to be balanced having shafts, said cradle shafts being trunnioned in the spaced bearing members, means for locking the cradle shafts against rotation in the bearing members, a driving stator coil fixedly mounted within the cradle in juxtaposition to the rotatable part, a transfer shaft coupled to the rotor shaft, angular indexing means driven by the transfer shaft, said angular indexing means comprising a disc fixed to the transfer shaft, a pin carried by the periphery of said disc and magnetic means mounted adjacent the disc periphery whose field is altered by the passing of the pin to give an angular index point.

6. In a machine for balancing rotating parts, resiliently mounted spaced aligned bearing members, spaced cradle members comprising hollow cylindrical central portions and radially extending arms for rotatably supporting a rotor to be tested, means for securing the ends of the arms together in definite spaced relation, a driving stator field winding rigidly mounted within the enclosure formed by the spaced cradle members in juxtaposition to the rotor to rotate the same, said hollow cylindrical cradle portions being non-rotatably mounted in the resiliently mounted bearing members.

7. In a machine for balancing rotating parts, resiliently mounted spaced aligned bearing members, spaced cradle members comprising hollow cylindrical central portions and radially extending arms for rotatably supporting a rotor to be tested, means for securing the ends of the arms together in definite spaced relation, a driving stator field winding rigidly mounted within the enclosure formed by the spaced cradle members in juxtaposition to the rotor to rotate the same, said hollow cylindrical cradle portions being non-rotatably mounted in the resiliently mounted bearing members, and angular indexing means secured to and driven by the rotor shaft.

8. In a machine for balancing rotating parts, resiliently mounted spaced aligned bearing members, spaced cradle members comprising hollow cylindrical central portions and radially extending arms for rotatably supporting a rotor to be tested, means for securing the ends of the arms together in definite spaced relation, a driving stator field winding rigidly mounted within the enclosure formed by the spaced cradle members in juxtaposition to the rotor to rotate the same, said hollow cylindrical cradle portions being non-rotatably mounted in the resiliently mounted bearing members, a transfer shaft connected to the rotor shaft and means for generating an electric pulse once per revolution connected to and driven by said shaft.

9. In a balancing machine for balancing rotating parts, a supporting frame, a plurality of spaced aligned open bearing members resiliently slung from the frame, a driving stator field assembly for mounting a driven rotor to be balanced supported in the bearing members, and means whose electrical capacity will be changed by relative movement between parts thereof mounted adjacent each bearing member and subject to the vibrations thereof caused by the rotation of the rotor.

10. In a balancing machine for balancing rotating parts, a supporting frame, a plurality of spaced aligned open bearing members resiliently slung from the frame, a driving stator field assembly for mounting a driven rotor to be balanced supported in the bearing members, a plate mounted in insulated relation with respect to the frame, a second spaced plate mounted in contact with the open bearing members whereby a condenser is formed by the two plates and vibration of the bearing members due to rotation of the rotor will cause capacity variation and provide an indication of such vibration.

11. In a balancing machine for balancing rotating parts, a supporting frame, a plurality of spaced aligned open bearing members resiliently slung from the frame, a driving stator field assembly for mounting a driven rotor to be balanced supported in the bearing members, an arm projecting from each open bearing member, a stud threaded into the bearing members, a flexible arm insulatably mounted on each stud, a weight on each flexible arm projecting in juxtaposition to the first named arms and forming an electrical condenser therewith whereby vibration of each bearing member will cause relative movement between the arms and therefore capacity change to indicate vibration caused by rotation of the rotor.

THOMAS C. VAN DEGRIFT.